Feb. 4, 1958  R. J. MOLYNEAUX ET AL  2,822,455
ELECTRIC HEATING APPARATUS
Filed Aug. 21, 1953  3 Sheets-Sheet 1

INVENTORS
Robert J. Molyneaux
Kenneth H. Walkoe
BY
Smith, Olsen, Baird & Gulbrandsen
ATTYS.

Feb. 4, 1958 R. J. MOLYNEAUX ET AL 2,822,455
ELECTRIC HEATING APPARATUS
Filed Aug. 21, 1953 3 Sheets-Sheet 2

INVENTORS
Robert J. Molyneaux
Kenneth H. Walkoe
BY
Smith, Olsen, Baird & Gulbrandsen
ATTYS.

Feb. 4, 1958 R. J. MOLYNEAUX ET AL 2,822,455
ELECTRIC HEATING APPARATUS
Filed Aug. 21, 1953 3 Sheets-Sheet 3

INVENTOR.
Robert J. Molyneaux
Kenneth H. Walkoe
BY
Smith, Olsen, Baird + Gulbrandsen
ATTYS.

United States Patent Office 2,822,455
Patented Feb. 4, 1958

2,822,455

ELECTRIC HEATING APPARATUS

Robert J. Molyneaux, Chicago, and Kenneth H. Walkoe, Lombard, Ill., assignors to General Electric Company, a New York corporation Application August 21, 1953, Serial No. 375,753

12 Claims. (Cl. 219—20)

The present invention relates to electric heating apparatus and more particularly to automatic temperature control systems for cooking vessels heated by electric heating units or hotplates.

In conventional cooking apparatus of the character noted, a specially constructed cooking vessel is required to control the supply of electric power to the associated supporting hotplate, the cooking vessel incorporating a thermostatic switch; and a detachable electric cable is required between the cooking vessel and the remainder of the control network.

While this apparatus is operative to control the temperature of the cooking vessel and its contents, as contrasted with systems that control only the temperature of the hotplate, the arrangement is expensive to manufacture, inconvenient to use, complex in operation and unsanitary in service.

Accordingly, it is a general object of the present invention to provide in an electric heating apparatus, an improved automatic temperature control system for any cooking vessel, or the like, that may be supported upon an associated electric heating unit or hotplate.

Another object of the invention is to provide an automatic temperature control arrangement of the character noted, that is governed directly and principally by the temperature of the cooking vessel and its contents, and that is not subject to any substantial thermal influence from the heating unit or hotplate that is employed for the purpose of heating the cooking vessel and its contents.

Another object of the invention is to provide in an automatic temperature control system of the character noted, an improved arrangement of thermistors operatively associated with the cooking vessel and included in an associated bridge circuit, so that an accurate and sensitive thermal control is obtained in the system that is established by the temperature of the cooking vessel.

Another object of the invention is to provide in an automatic temperature control system of the character noted, an improved arrangement of a push-pull amplifier, so that the thermally governed electric controls that are derived from the cooking vessel are properly amplified and are positively employed to govern a power switch for controlling the connection and disconnection of the heating unit or hotplate with respect to the associated source of electric power supply.

A further object of the invention is to provide in an automatic temperature control system of the character noted, an improved arrangement of a manually operable controller for selectively and accurately presetting the temperature of the cooking vessel and its contents that is to be maintained.

A further object of the invention is to provide in an automatic temperature control system of the character noted, a manually operable controller that may be selectively set from an off position either to include or to exclude the automatic temperature control arrangement in the heating circuit of the associated heating unit or hotplate.

Further features of the invention pertain to the particular arrangement of the elements of the electric heating apparatus and the temperature sensing unit and the associated control network that are incorporated therein, whereby the above-outlined and additional operating features thereof are attained.

The invention, both as to its organization and method of operation, together with further objects and advantages thereof, will best be understood by reference to the following specification taken in connection with the accompanying drawings, in which.

Figure 2:
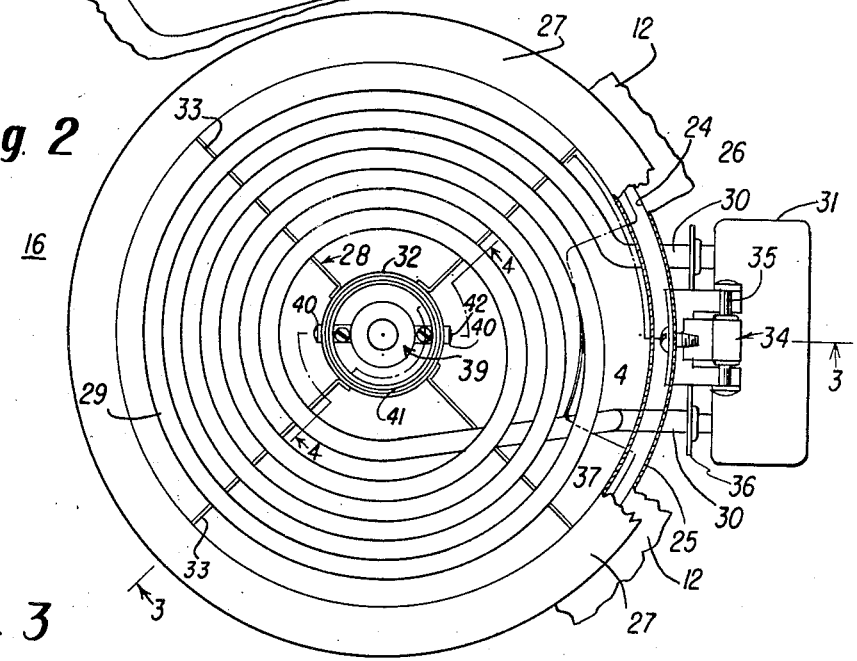
Fig. 2 is an enlarged plan view of one of the electric heating units or hotplates incorporated in the electric range shown in Fig. 1.
Figure 3:
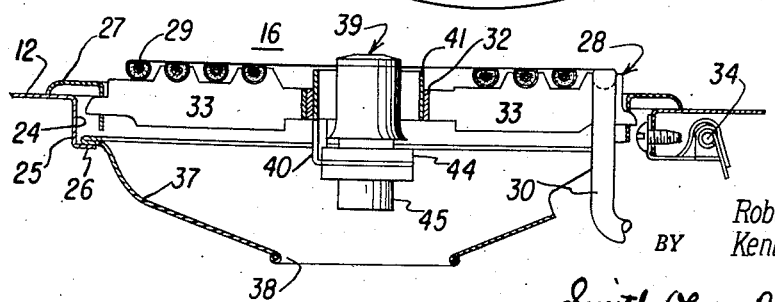
Fig. 3 is an enlarged vertical sectional view of the electric heating unit or hotplate, taken in the direction of the arrows, along the offset line 3—3 in Fig. 2.
Figure 4:
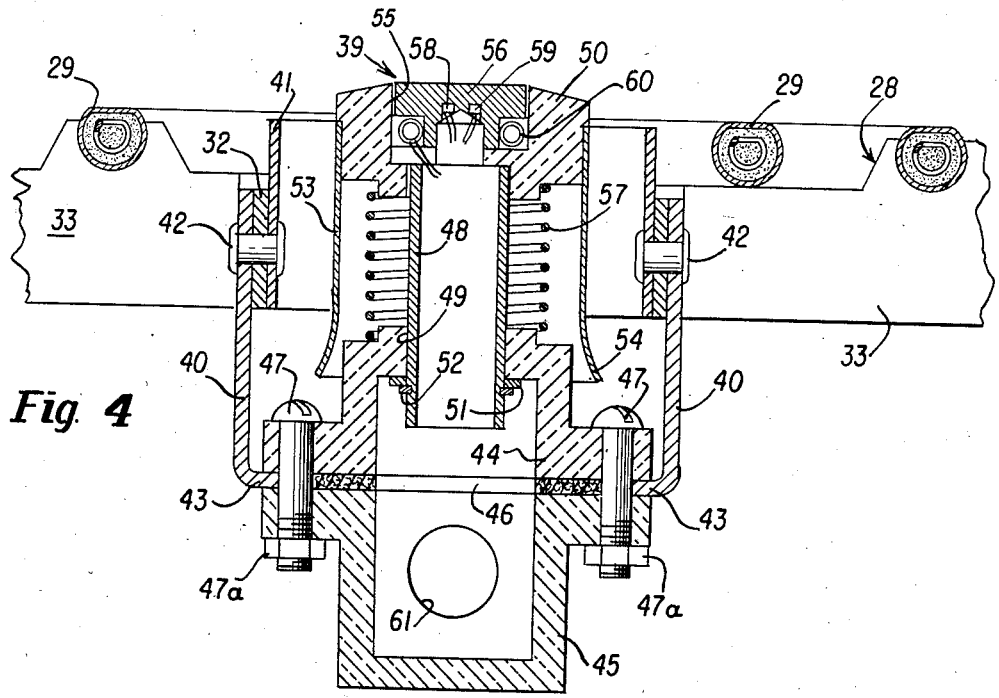
Fig. 4 is a greatly enlarged fragmentary vertical sectional view of the electric heating unit or hotplate, taken in the direction of the arrows along the offset line 4—4 in Fig. 2, illustrating the construction of the temperature sensing unit incorporated therein and forming a part of the electric control circuit.
Figure 6:
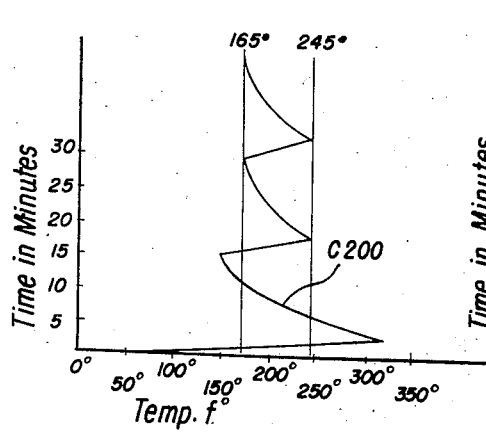
Figure 7:
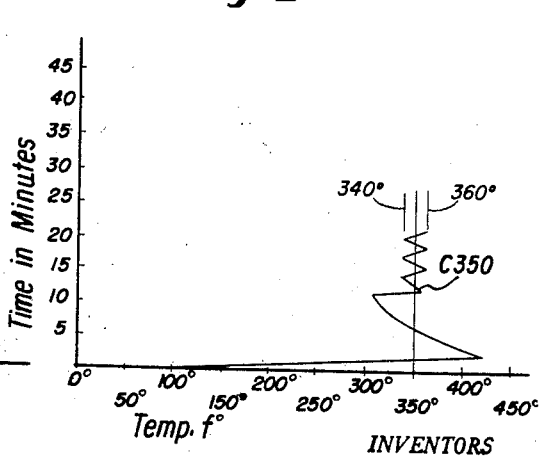
Figure 5:
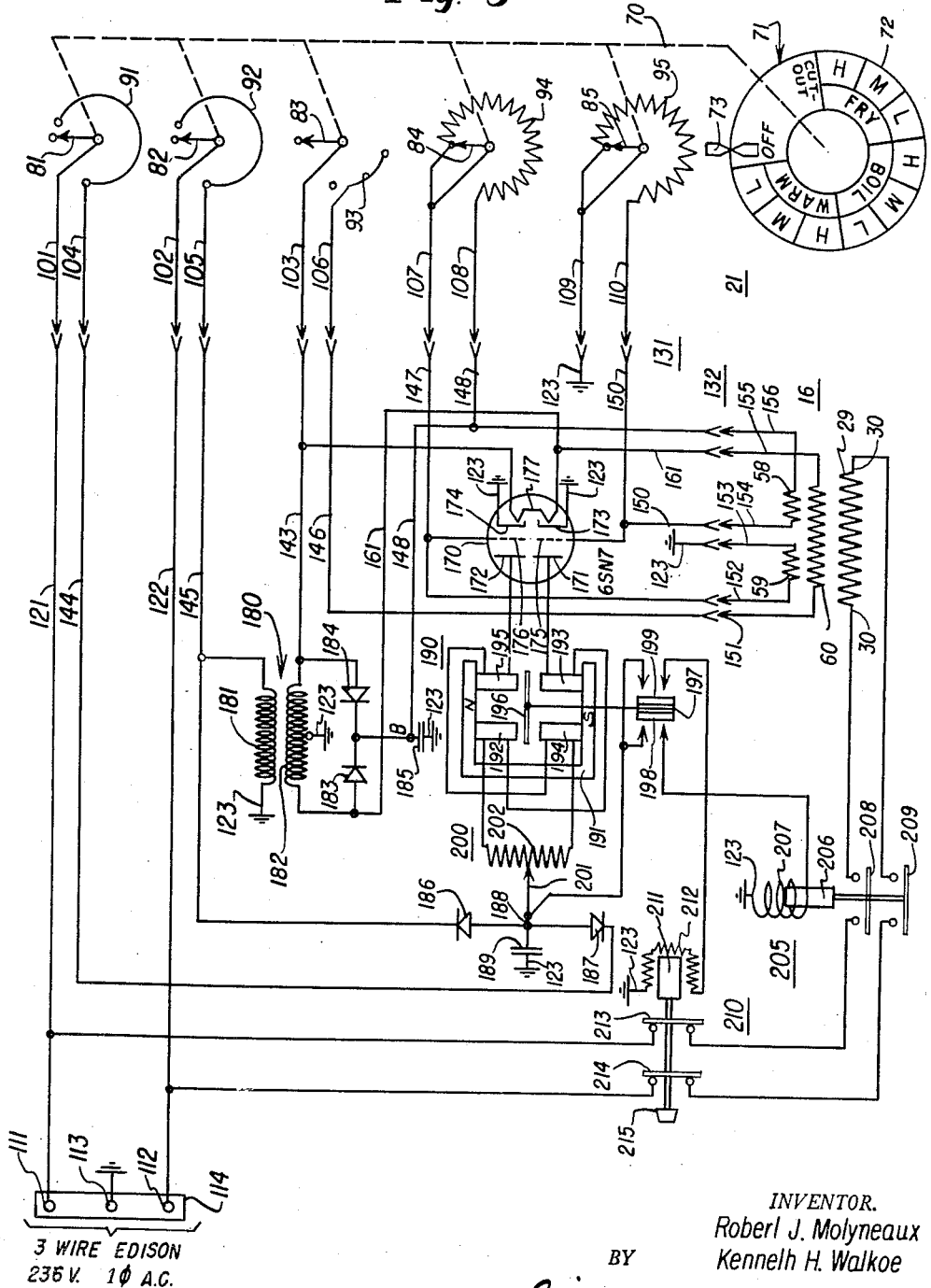

Fig. 5 is a diagram of the electric control circuit for the electric heating unit or hotplate shown in Figs. 2 and 3 and incorporating the temperature sensing unit shown in Fig. 4; and Figs. 6 and 7 are diagrams of respective low temperature and high temperature performance characteristics obtained from a cooking vessel supported by the heating unit or hotplate and governed by the electric control circuit of Fig. 5.

Figure 1:
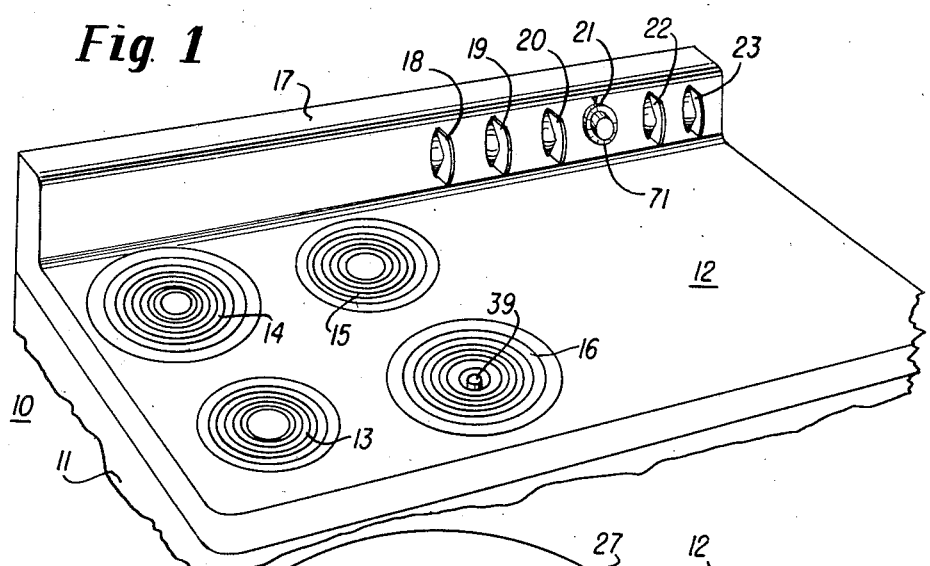
Figure 1 is a fragmentary front perspective view of the upper portion of an electric range incorporating electric heating apparatus embodying the present invention.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16, arranged in spaced-apart relation in a substantially rectangular pattern on the left-hand side thereof. The body 11 houses an oven, not shown, in the right-hand portion thereof and a compartment, not shown, in the left-hand portion thereof, the oven and the compartment being respectively provided with front doors, not shown.

The cooking top 12 carries an upstanding backsplash 17 adjacent to the rear thereof, that, in turn, carries a plurality of surface heating unit selector switches 18, 19 and 20, a special control switch 21, an oven selector switch 22, and an oven temperature regulator or thermostatic switch 23, the elements 18 to 23, inclusive, being arranged in a row on the right-hand side of the backsplash 17. The selector switches 18, 19 and 20 respectively correspond to the surface heating units 13, 14 and 15 and are respectively included in the electric heating circuits thereof; while the special control switch 21 corresponds to the surface heating unit 16 that is of special construction, more fully described hereinafter. Each of the selector switches 18, 19 and 20, and the oven selector switch 22, as well as the thermostatic switch 23, are of conventional construction and arrangement.

The cooking top 12 has a plurality of openings therein that respectively receive the surface heating units 13, etc.; and each of the surface heating units 13, 14 and 15 may be fundamentally of the construction disclosed in U. S. Patent No. 2,565,443, granted on August 21, 1951 to Oliver G. Vogel and Francis E. Kirk; while the surface heating unit 16 is of special construction, described more fully below.

As shown in Figs. 2 and 3, the opening 24 formed in the cooking top 12 receives the surface heating unit 16 that is of the hotplate type, the opening 24 being substantially surrounded by a depending flange 25, terminating in an inwardly directed ledge 26; and the hotplate 16 including an annular trim ring 27 supporting a spider 28 carrying a heating element 29. More particularly, the heating element 29 is in the form of a continuous helical coil or spiral, the turns of which are arranged in radially spaced-apart relation. Preferably the heating element 29 is of the metal sheath-helical resistance conductor type disclosed in U. S. Patent No. 1,367,341, granted on February 1, 1921, to Charles C. Abbott, the heating element 29 including two terminals 30 at the opposite ends thereof that carry a suitable terminal block 31 in which the exterior electrical connections are made. The spider 28 comprises a substantially centrally disposed upstanding ring 32 and four substantially equally angularly spaced-apart arms 33 extending between the central ring 32 and the surrounding trim ring 27, the coils of the heating element 29 being selectively staked to the arms 33 in the general manner disclosed in the Vogel and Kirk patent mentioned. The top surfaces of the coils of the heating element 29 are flattened to define a substantially horizontal plane adapted to engage and to support the bottom wall of a cooking vessel, or the like, not shown. The hotplate 16, as a whole, is pivotally mounted upon the cooking top 12 for cooperating movements with respect to the opening 24 into a substantially horizontal work position and an upwardly tilted cleaning position by an arrangement including a hinge mechanism 34 that is preferably of the construction of that disclosed in U. S. Patent No. 2,565,432, granted on August 21, 1951, to Francis E. Kirk. More particularly, the hinge mechanism 34 comprises a pintle 35 securing together two hinge arms that are respectively connected to the depending flange 24 and to a supporting plate 36 carried by the terminals 30 of the heating element 29. Also, a drip pan 37 is removably arranged within the opening 24 below the hotplate 16 in its normal work position, the rim of the drip pan engaging the inwardly directed ledge 26. The drip pan 37 is downwardly dished and receives any spillage through the hotplate 16, the central portion of the drip pan 37 having an opening 38 therein that is arranged to direct the spillage onto an associated removable drip tray, not shown, arranged in the compartment disposed in the left-hand side of the body 11.

The hotplate 16 carries a temperature sensing unit 39 within the central ring 32 and that is adapted to engage the bottom wall of a cooking vessel, or the like, supported upon the heating element 29; which temperature sensing unit 39 is best illustrated in Fig. 4. More particularly, a pair of opposed depending arms 40 are arranged exteriorly of the central ring 32, and an upstanding tubular heat shield 41 is arranged interiorly of the central ring 32, the arms 40 and the heat shield 41 being retained in place by an opposed pair of rivets 42. The arms 40 terminate in inwardly directed flanges 43 disposed below the central ring 32 that carry upper and lower substantially cup-shaped insulating houses 44 and 45 formed of lava, or the like. The upper housing 44 is arranged in inverted position and constitutes a supporting base, the houses 44 and 45 being retained in place upon the flanges 43, with an asbestos ring 46 clamped therebetween, by removable screws 47 provided with cooperating nuts 47a. An upstanding tubular member 48 is slidably mounted in a cooperating opening 49 provided in the top of the base 44, the upper end of the tubular member 48 carrying an insulating ring 50 formed of lava, or the like, and arranged within the heat baffle 41 in spaced relation with respect thereto. The tubular member 48 is retained in place by an arrangement including a surrounding washer 51 and a cooperating lock ring 52 carried on the lower end thereof and cooperating with the top of the base 44 adjacent to the opening 49. The ring 50, in turn, carries a depending tubular heat shield 53 of general skirt-like structure that is spaced inwardly with respect to the cooperating heat shield 41, the extreme lower end of the heat shield 53 being outwardly flared as indicated at 54, so that it covers the top of the base 44. A central cavity 55 is formed in the top of the ring 50 and carries a sensing button 56 formed of aluminum, or the like.

In the arrangement, the heat shields 41 and 53, as well as the tubular member 48, are preferably formed of stainless steel, or other bright and reflective material; while the sensing button 56 is formed of aluminum, or the like, as previously noted, so that it constitutes a good heat conductor capable of following closely the temperature of the bottom wall of a cooking vessel, or the like, supported by the heating element 29. The tubular member 48, the ring 50, the heat shield 53 and the sensing button 56 are movable as a unit with respect to the base 44 by virtue of the arrangement of a coil spring 57 surrounding the tubular member 48 and disposed between the top of the base 44 and the bottom of the ring 50. More particularly, the coil spring 57 normally biases the parts 48, 50, 53 and 56 upwardly with respect to the base 44, whereby the top surface of the sensing button 56 is normally disposed slightly above the substantially horizontal plane of the flattened top surface of the heating element 29. However, when a cooking vessel, or the like, is placed upon the heating element 29, the bottom wall thereof engages the top surface of the sensing button 56 moving the elements 48, 53 and 56 downwardly with respect to the base 44 against the bias of the coil spring 57, whereby the top surface of the sensing button 56 is urged into good thermal contact with the bottom wall of the cooking vessel by the coil spring 57.

Two temperature sensing resistors 58 and 59 are arranged in two cooperating cavities formed in the lower surface of the sensing button 56 and disposed on opposite sides of the center thereof; and a surrounding biasing resistor 60 is arranged in an annular cavity provided in the bottom of the sensing button 56 in surrounding relation with respect to the temperature sensing resistors 58 and 59. The temperature sensing resistors 58 and 59 and the biasing resistor 60 are movable with the sensing button 56 and are arranged in good heat exchange relation therewith, for a purpose more fully explained hereinafter. Also the temperature sensing resistors 58 and 59 and the biasing resistor 60 are included in external electric circuits, described more fully hereinafter, the wiring to these elements extending through the tubular member 48 and through a hole 61 provided in the housing 45. Since the wiring mentioned is subject to a rather high temperature, it is preferably formed of silver, or the like, and is preferably covered with an insulating material capable of withstanding the relatively high temperature mentioned, such, for example, as polytetrafluoroethylene, sold as "Teflon." The biasing resistor 60 may be formed of any suitable resistance material, such, for example, as a nickel-chrome alloy; while each of the sensing resistors 58 and 59 is formed of a material having a high negative temperature coefficient of resistance, such, for example, as the ceramic-like material consisting of sintered uranium oxide, and an oxide of magnesium, manganese, titanium, iron, nickel, cobalt, zinc, etc., and known as thermistor material. For example, each of the thermistors 58 and 59 may have the exceedingly high temperature coefficient of resistance corresponding to a resistance rate change of $-0.044$ ohm/ohm/° C.; whereby the characteristic of each of the thermistors mentioned may be as follows:

Temperature (° C.):                                Total resistance
                                                          (ohms)
25 ------------------------------------------ 100,000
50 ------------------------------------------  34,000
100 -----------------------------------------   6,000
150 -----------------------------------------   1,700
200 -----------------------------------------     580

Referring now to Fig. 5, the manually operable control switch 21 carried by the backsplash 17 and individually associated with the hotplate 16 comprises a rotatably mounted operating shaft 70 carrying a manual dial or knob 71 on the outer end thereof and provided with indicia 72 cooperating with an index marker 73 carried by the backsplash 17. More particularly, the control switch 21 comprises off, warm, boil, fry and cutout positions that correspond to respective portions of the indicia 72 carried by the manual dial 71 and cooperating with the index marker 73, each of the warm, boil and fry ranges including low, medium and high subsections. In the arrangement, the indicia 72 carried by the manual dial 71 correspond to temperatures of a cooking vessel supported by the hotplate 16; whereby the warm range may correspond to the temperature range 120°–220° F., the boil range may correspond to the temperature range 220°–320° F.; and the fry range may correspond to the temperature range 320°–420° F. Accordingly, the warm, boil and fry ranges respectively correspond to meat-cooking, candy-making and deep fat-frying cooking operations.

Further the rotatable shaft 70 of the control switch 21 carries five wipers 81, 82, 83, 84 and 85 that are simultaneously adjusted as the manual knob 71 is rotated. The wipers 81, 82 and 83 respectively comprise portions of three switches respectively including cooperating conducting segments 91, 92 and 93; while the wipers 84 and 85 respectively comprise portions of two potentiometers respectively including cooperating resistors 94 and 95. The wipers 81, 82 and 83 respectively terminate conductors 101, 102 and 103, while the conducting segments 91, 92 and 93 respectively terminate conductors 104, 105 and 106. The wiper 84 and one end of the resistor 94 commonly terminate a conductor 107; while the other end of the resistor 94 terminates a conductor 108. Similarly, the wiper 85 and one end of the resistor 95 commonly terminate a conductor 109; while the other end of the resistor 95 terminates a conductor 110. In the arrangement, when the manual dial 71 occupies its off position, the wipers 81, 82 and 83 respectively disengage the cooperating conducting segments 91, 92 and 93, the wiper 84 engages the one end of the resistor 94 terminating the conductor 107, and the wiper 85 engages the one end of the resistor 95 terminating the conductor 109. When the manual dial 71 is rotated in the clockwise direction out of its off position about 10° into the low subsection of its warm range, the wipers 81 and 82 respectively engage the conducting segments 91 and 92, the wiper 83 remains in disengaging relation with respect to the conducting segment 93, the wiper 84 shorts-out a small portion of the associated resistor 94 that is included between the conductors 107 and 108, and the wiper 85 shorts-out a small portion of the associated resistor 95 that is included between the conductors 109 and 110. As the manual dial 71 is rotated through its warm range and through its boil range, the wipers 81 and 82 remain in engagement with the respective conducting segments 91 and 92, completing connections between the respective pairs of conductors 101—104 and 102—105, the wiper 83 remains in disengagement with respect to the conducting segment 93, and the wipers 84 and 85 progressively short circuit additional portions of the respective resistors 94 and 95. When the manual dial 71 is rotated further in the clockwise direction into the low subsection of its fry range, the wipers 81 and 82 continue to engage the respective conducting segments 91 and 92, the wiper 83 engages the conducting segments 93 completing a connection between the conductors 103 and 106, and the wipers 84 and 85 short circuit further portions of the cooperating resistors 94 and 95. Ultimately, when the manual dial 71 is rotated in the clockwise direction into its cutout position, the wipers 81 and 82 continue to engage the respective conducting segments 91 and 92, the wiper 83 disengages the conducting segment 93, the wiper 84 engages the other end of the resistor 94 terminating the conductor 108 so as directly to connect together the conductors 107 and 108, and the wiper 85 engages the other end of the resistor 95 terminating the conductor 110 so as directly to connect together the conductors 109 and 110.

Further, the circuit network comprises a three-wire Edison source of power supply of 236 volts, single-phase A. C., including two outside lines and a grounded neutral line, that are respectively connected to corresponding terminals 111, 112 and 113 carried by a terminal block 114; whereby in the circuit network the outside lines are indicated at 121 and 122 and the grounded neutral line is indicated at 123. For convenience, the neutral line conductor 123 is indicated by a ground symbol at various points in the circuit network. Further, the circuit network comprises two detachable plug and jack combination fixtures 131 and 132. The plug and jack combination fixture 131 comprises a plug including ten points respectively terminating the conductors 101 to 110, inclusive, and a jack including ten points respectively terminating the outside line 121, a conductor 144, the outside line 122, a conductor 145, a conductor 143, a conductor 146, a conductor 147, a conductor 148, the neutral line 123 and a conductor 150. Similarly, the plug and jack combination fixture 132 comprises a plug including six points respectively terminating six conductors 151 to 156, inclusive, and a jack including six points respectively terminating the conductors 146 and 147, the neutral line 123, the conductor 150, a conductor 161, and the conductor 148. In turn, the conductors 151 and 155 are connected to the terminals of the biasing resistor 60; the conductors 152 and 153 are connected to the terminals of the thermistor 59; and the conductors 154 and 156 are connected to the terminals of the thermistor 58. Accordingly, it will be understood that the conductors 101 to 110, inclusive, constitute an electric cable extending from the main portion of the circuit network to the control switch 21, and that when the plug is inserted into the jack in the combination fixture 131, the conductors 101, 104, 102, 105, 103, 106, 107, 108, 109 and 110 are respectively connected to the conductors 121, 144, 122, 145, 143, 146, 147, 148, 123 and 150. Likewise, the conductors 151 to 156, inclusive, constitute an electric cable extending from the main portion of the circuit network to the hotplate 16, and that when the plug is inserted into the jack in the combination fixture 132 the conductors 151, 152, 153, 154, 155 and 156 are respectively connected to the conductors 146, 147, 123, 150, 161 and 148. Further, it is noted that the main portion of the circuit network may be arranged behind the body 11 of the range 10.

Further, the circuit network comprises a vacuum tube amplifier including a dual triode tube 170 that is preferably of type 6SN7, including two anodes 171 and 172, two cathodes 173 and 174 and two control grids 175 and 176, as well as a common cathode heater 177 for the cathodes 173 and 174, the elements 171, 175 and 173 being arranged as a first electron discharge device, and the elements 172, 174 and 176 being arranged as a second electron discharge device. Also the circuit network includes a transformer 180 provided with a primary winding 181 and a secondary winding 182, the primary winding 181 being connected between the conductor 145 and the neutral line 123, the mid-tap of the secondary winding 182 being connected to the neutral line 123, and the two extremities of the secondary winding 182 being respectively connected to the conductors 143 and 161. Two selenium rectifiers 183 and 184 are connected in series across the conductors 143 and 161, the intermediate point between the rectifiers 183 and 184 being connected to the conductor 148 so as to provide a negative biasing voltage thereupon, for a purpose more fully explained hereinafter, a filtering condenser 185 being connected between the conductor 148 and the neutral line 123. The sections of the cathode heater 177 are arranged in series relation and connected across the conductors 143 and 161, whereby the cathodes 173 and 174 may be rendered electron-emissive. Two selenium rectifiers 186 and 187 are connected in series across the conductors 144 and 145, the intermediate point between the rectifiers 186 and 187 being connected to a conductor 188 so as to provide a positive plate voltage thereupon, for a purpose more fully explained hereinafter, a filtering condenser 189 being connected between the conductor 188 and the neutral line 123.

Also the circuit network includes a differential relay 190 that may be of standard Western Electric Company construction including a permanent magnet polarized field element 191 carrying four poles respectively carrying four windings 192, 193, 194 and 195 and a cooperating pivotally mounted armature 196. The armature 196 carries an operating member 197 having a normal intermediate position and operated left-hand and right-hand extreme positions, the operating member 197 also carrying contact bridging members 198 and 199 cooperating with associated contact pairs. The contact bridging members 198 and 199 occupy their open positions when the operating member 197 occupies its normal or intermediate position; and the contact bridging members 198 and 199 respectively close the associated pairs of contacts when the operating member 197 occupies its respective extreme operated positions. Also the circuit network comprises a potentiometer 200 including an adjustable arm 201 and an engaged resistor 202, the arm 201 being connected to the conductor 188, and the extremities of the resistor 202 being respectively connected to the anodes 171 and 172 via the winding pairs 192—193 and 194—195 of the differential relay 190. The cathodes 173 and 174 are directly connected to the neutral line 123, and the control grids 175 and 176 are respectively connected to the conductors 147 and 150.

Further, the circuit network includes a power switch 205 in the form of a contactor including an armature 206 provided with an operating winding 207 and two contact bridging members 208 and 209. Finally, the circuit network includes a circuit breaker 210 of conventional construction and arrangement including a solder pot 211 provided with a heat coil 212 and two contact bridging members 213 and 214, as well as a manual reset knob 215. In the arrangement, the circuit breaker 210 is disposed ahead of the power switch 205 between the source of power supply and the heating element 29 of the hotplate 16. More particularly, the outside lines 121 and 122 are respectively connected to two of the contacts of the two pairs respectively controlled by the bridging members 213 and 214; the other two of the contacts of the two last-mentioned pairs are respectively connected to two of the contacts of the two pairs respectively controlled by the bridging members 208 and 209; and the other two of the contacts of the two last-mentioned pairs are respectively connected to the extremities or terminals 30 of the heating element 29.

In the arrangement, the two resistors 94 and 95 and the two thermistors 58 and 59 are connected to form the four arms of a Wheatstone bridge, including two supply terminals to which the conductors 148 and 123 are respectively connected, and two control terminals to which the conductors 150 and 147 are respectively connected. The bridge circuit may be traced: from the negative biasing bus 148, the conductor 108, the resistor 94 (as a first arm of the bridge) and the conductors 107 and 147 to the first control terminal that is connected to the grid 176; from the negative biasing bus 148 via the conductor 156, the thermistor 58 (as a second arm of the bridge) and the conductors 154 and 150 to the second control terminal that is connected to the grid 175; from the relatively positive neutral line 123 via the conductor 109, the resistor 95 (as the third arm of the bridge) and the conductors 110 and 150 to the second control terminal that is connected to the grid 175; and from the relatively positive neutral line 123 via the conductor 153, the thermistor 59 (as the fourth arm of the bridge) and conductors 152 and 147 to the first control terminal that is connected to the grid 176.

Considering now the operation of the circuit network, when the control switch 21 occupies its normal off position, the wipers 81 and 82 disengage the cooperating conducting segments 91 and 92, whereby the operating circuit for the rectifiers 186 and 187 is open so that no plate potential appears upon the plate bus 188, whereby the two sections of the tube 170 are non-conductive so that the windings 192, 193, 194 and 195 of the differential relay 190 are deenergized in order that its armature 196 occupies its normal or intermediate position. At this time, the operating member 197 in its normal or intermediate position opens both of the cooperating pairs of contacts so that both the heat coil 212 of the circuit breaker 210 and the operating winding 207 of the power switch 205 are deenergized. The circuit breaker 210 normally occupies its closed position; and the power switch 205 normally occupies its open position deenergizing the heating element 29 of the hotplate 16. The transformer 180 is normally deenergized; the two sections of the tube 170 are non-conductive; and the biasing resistor 60 is deenergized.

Now assuming that the cook wishes to carry out a warm cooking operation upon the hotplate 16 and that the heating element 29 thereof is cold so that the thermistors 58 and 59 arranged in the sensing button 56 are cold, whereby the thermistors 58 and 59 have an exceedingly high resistance, as previously noted. At this time, the cook places the cooking vessel and its contents in its supported position upon the top surface of the heating element 29, whereby the bottom wall of the cooking vessel engages the sensing button 56 and moves the sensing unit 39 into its depressed position so that the sensing button 56 is in good thermal contact with the bottom of the cooking vessel. Finally, the cook rotates the manual dial 71 in the clockwise direction from its off position into its warm position; whereby the wipers 81 and 82 engage the respective conducting segments 91 and 92. At the wiper 82 and the conducting segment 92, a circuit is completed for energizing the primary winding 181 of the transformer 180; whereby the rectifiers 183 and 184 apply a negative potential to the negative biasing conductor 148 and energize the cathode heater 177 rendering electron-emissive the cathodes 173 and 174. Also, at the wipers 81 and 82 and the conducting segments 91 and 92, there is completed the operatnig circuit for the rectifiers 186 and 187, whereby a positive potential is applied to the positive plate bus 188 and through the potentiometer 200 via the windings 192—193 and the windings 194—195 of the differential relay 190 to the anodes 171 and 172. Also, at this time, the wipers 84 and 85 short-circuit small sections of the respective resistors 94 and 95, whereby a substantial negative bias appears upon the control grid 176 and an exceedingly small negative bias appears upon the control grid 175. Accordingly, the section of the tube 170, including the anode 172 and the cathode 174 is rendered only slightly conductive, whereas the section of the tube 170, including the anode 171 and the cathode 173 is rendered fully conductive; whereby the plate current traversing the windings 193 and 192 is greatly in excess of the current traversing the windings 195 and 194 so that the balance of the differential relay 190 is upset so that it operates its armature 196 in the clockwise direction so that the bridging member 198 closes the associated pair of contacts to complete a circuit for energizing the operating winding 207 of the power switch 205 between the positive plate bus 188 and the neutral line 123. When the operating winding 207 of the power switch 205 is thus energized, the power switch 205 is operated effecting closure of the bridging members 208 and 209; whereby the circuit for energizing the heating element 29 of the hotplate 16 across the outside lines 121 and 122 is completed.

As the temperature of the heating element 29 rises, the cooking vessel and its contents are heated, whereby the sensing button 56 is heated through the bottom wall of the cooking vessel to effect corresponding heating of the thermistors 58 and 59. At this point, it is noted that the sensing button 56 is shielded from direct radiation of heat from the heating element 29 by virtue of the arrangement of the heat shields 41 and 53, as shown in Fig. 4; and moreover, there is no substantial conduction of heat to the sensing button 56 through the mounting arrangement since the base 44 is formed of thermally insulating material as previously noted, and the sensing unit 39, as a whole, is arranged in spaced relation with respect to the surrounding heat shield 41. Accordingly, the sensing button 56 senses the temperature of the bottom wall of the cooking vessel and its contents deriving substantially all of its heat therefrom; whereby the thermistors 58 and 59 are heated, the temperatures of the thermistors 58 and 59 bearing a substantially linear relationship with respect to the temperature of the bottom wall of the cooking vessel.

As the temperature of the thermistors 58 and 59 are thus increased, the resistances thereof sharply decrease by virtue of the high negative temperature coefficient of resistance thereof, whereby the Wheatstone bridge is influenced toward a balanced condition. More particularly, as the temperature of the thermistor 58 increases, the resistance thereof decreases, so that the ratio between the resistance of the thermistor 58 and the resistance of the resistor 95 is decreased; whereby an increase in the negative bias applied to the control grid 175 takes place so that the section 171—173 of the tube 170 is rendered less conductive to reduce the current traversing the windings 193 and 192 of the differential relay 190. On the other hand, as the temperature of the thermistor 59 increases, the resistance thereof decreases, so that the ratio between the resistance of the thermistor 59 and the resistance of the resistor 94 is decreased, whereby a decrease in the negative bias applied to the control grid 176 takes place so that the section 172—174 of the tube 170 is rendered more conductive to increase the current traversing the windings 195 and 194 of the differential relay 190. Ultimately the temperature of the sensing button 56 is increased, as the cooking vessel and its contents are heated, to a point whereat the resistances of the thermistors 58 and 59 substantially match the resistances of the adjusted resistors 94 and 95; whereby the Wheatstone bridge is substantially balanced so that the currents traversing the two sections of the tube 170 are substantially equal in order that the armature 196 of the differential relay 190 is returned back into its normal intermediate position. At this time, the bridging member 198 interrupts the circuit for the operating winding 207; whereby the power switch 205 is returned into its normal open position bringing about the deenergization of the heating element 29.

As time proceeds, the temperature of the heating element 29 subsides so that the temperature of the cooking vessel and its contents subsides bringing about a reduction in the temperature of the sensing button 56 and a consequent decrease in the temperature of the thermistors 58 and 59 so that the resistances thereof are again automatically increased, bringing about a sufficient unbalance of the Wheatstone bridge that the currents traversing the two sections of the tube 170 are appropriately unbalanced; whereby the differential relay 190 is reoperated so that the bridging member 198 recloses the circuit for the operating winding 207, so that the power switch 205 is returned into its closed position; whereby the heating element 29 is again connected across the outside lines 121 and 122.

As time proceeds the heating element 29 again raises the temperature of the cooking vessel and its contents; whereby the temperature of the sensing button 56 is again elevated so that the thermistors 58 and 59 again bring about balancing of the Wheatstone bridge and the consequent return of the power switch 205 back into its open position to effect deenergization of the heating element 29.

In view of the foregoing, it will be understood that the power switch 205 is alternately operated between its open and closed positions to effect corresponding intermittent heating of the heating element 29 so as to maintain the temperature of the cooking vessel and its contents supported by the hotplate 16 substantially at the desired warm temperature. The temperature of the cooking vessel and its contents that is maintained by the circuit network, as described above, is related to the warm position of the control switch 21 since the warm position of the control switch 21 effects simultaneous adjustments of the resistances of the resistors 94 and 95, whereby the initial unbalance of the Wheatstone bridge is adjustably set. Thus when the control switch 21 occupies its warm position, the initial unbalance of the Wheatstone bridge is only moderate so that the resistances of the thermistors 58 and 59 must be changed only moderately corresponding to a warm temperature before the Wheatstone bridge is again balanced.

On the other hand, when the cook wishes to carry out a boil cooking operation, the control dial 71 is rotated in the clockwise direction from its off position beyond its warm range into its boil range; whereby the adjustment of the resistors 94 and 95 is greater than that described above in conjunction with the warm cooking operation so that the initial unbalance of the Wheatstone bridge is substantial so that the resistances of the thermistors 58 and 59 must change substantially corresponding to a boil temperature before the Wheatstone bridge is again balanced. Accordingly, when the manual dial 71 occupies its boil position the time interval of closure of the heating element 29 in its repeated cycles is greater than that when the manual dial 71 occupies its warm position; whereby the temperature of the cooking vessel and its contents are maintained at the higher boil temperature.

Further, when the cook wishes to carry out a fry cooking operation, the control dial 71 is rotated in the clockwise direction from its off position beyond its warm and boil ranges into its fry range, whereby the adjustment of the resistors 94 and 95 is still greater than that described above in conjunction with the boil cooking operation in order that the initial unbalance of the Wheatstone bridge is severe so that the resistance of the thermistors 58 and 59 must change severely corresponding to a fry temperature before the Wheatstone bridge is again balanced. Accordingly, when the manual dial 71 occupies its fry position, the time interval of closure of the heating element 29 in its repeated cycles is still greater than when the manual dial 71 occupies its boil position; whereby the temperature of the cooking vessel and its contents are maintained at the still higher fry temperature.

Also in connection with the fry cooking operation, it is noted that when the manual dial 71 occupies its fry position, the wiper 83 engages the conducting segment 93 completing a circuit for connecting the biasing resistor 60 across the conductors 143 and 161, this circuit including the conductors 103, 106, 146, 151 and 155; whereby the biasing heater 60 is heated effecting biasing heating of the sensing button 56 and consequently of the thermistors 58 and 59. This arrangement for effecting biasing heating of the thermistors 58 and 59 from the biasing heater 60, in addition to heating of the thermistors 58 and 59 in the usual manner from the bottom of the cooking vessel, is useful to prevent undue swings in the temperature of the cooking vessel in the cyclic operation of the power switch 205, as explained more fully hereinafter. In passing, it is noted that the arrangement of the biasing heater 60 is not essential to the fry cooking operation, but is useful for minimizing the temperature swings of the cooking vessel; and likewise, if desired, the biasing heater 60 may be included in the warm and boil cooking operations, although ordinarily this is not necessary, since the temperatures involved are lower and are not otherwise subject to the abnormal swings mentioned.

Finally, should the cook wish to use the hotplate 16 in a cooking operation without temperature control, the manual dial 71 is rotated in the clockwise direction from its off position through its warm, boil and fry position into its cutout position, whereby the wipers 84 and 85 respectively engage the other ends of the resistors 94 and 95 respectively terminating the conductors 108 and 109. Thus in this case, the negative biasing conductor 148 is directly connected to the control grid 176 and the neutral conductor 123 is directly connected to the control grid 175, whereby the current traversing the section 171—173 of the tube 170 is a maximum, and the current traversing the section 172—174 of the tube 170 is a minimum; which currents cannot be varied by the resistances of the thermistors 58 and 59 since the potentials mentioned are directly applied to the control grids 175 and 176. Accordingly, the Wheatstone bridge cannot be balanced so that the differential relay 190 is retained in its operated position effecting continuous energization of the operating winding 207 so that the power switch 205 is retained continuously in its operated position to bring about continuous energization of the heating element 29. Also, in the cutout position of the manual dial 71, the wiper 83 disengages the conducting segment 93 so as to deenergize the biasing heater 60.

When the control switch 21 occupies any one of its warm, boil, fry or cutout positions, described above, the corresponding cooking operation may be terminated merely by returning the manual dial 71 in the counterclockwise direction back into its off position so that the wipers 81 and 82 disengage the respective conducting segments 91 and 92 so as to effect the interruption of power to the rectifiers 186 and 187, whereby potential is removed from the positive plate bus 188 rendering non-conductive the two sections of the tube 170 so that the differential relay 190 is deenergized, the armature 196 being returned back into its normal intermediate position effecting the deenergization of the operating winding 207 and the consequent return of the power switch 205 into its open position bringing about deenergization of the heating element 29. Also, in off position of the manual dial 71, the transformer 180 is deenergized so as to interrupt the supply of power to the rectifiers 183 and 184 and the cathode heater 177.

In connection with the operation of the circuit network, it is pointed out that should the power switch 205 mechanically fail to return into its open position, as a consequence of the return of the armature 196 of the differential relay 190 back into its normal intermediate position, in any one of the warm, boil, or fry cooking operations described above, energization of the heating element 29 is continued; whereby the temperature of the cooking vessel and its contents is elevated above that desired and previously set by the position of the manual dial 71. However, as this overheating of the cooking vessel takes place, the temperatures of the thermistors 58 and 59 rise further so that the Wheatstone bridge is unbalanced in the opposite direction, whereby the current traversing the section 172—174 of the tube 170 exceeds substantially the current traversing the section 171—173 of the tube 170 so that the differential relay 190 is unbalanced in the opposite direction causing the armature 196 thereof to be rotated in the counterclockwise direction so that the bridging member 199 closes the associated pair of contacts effecting energization of the heat coil 212 associated with the solder pot 211 incorporated in the circuit breaker 210. After a predetermined heating of the solder pot 211 the circuit breaker 210 is automatically operated into its open position so that the bridging members 213 and 214 interrupt the connection between the outside lines 121 and 122 and the heating element 29 independently of the closed position of the faulty power switch 205. Thus the circuit breaker 210 constitutes a protective device preventing overheating of the heating element 29 in the event of mechanical failure of the power switch 205. After the circuit to the heating element 29 has been interrupted by the circuit breaker 210 the thermistors 58 and 59 cool so that the Wheatstone bridge is again substantially balanced causing the armature 196 of the differential relay 190 to be returned into its normal intermediate position so that the bridging member 199 interrupts the circuit for the heat coil 212. Thereafter when the solder pot 211 cools, the circuit breaker 210 may be operated manually back into its normally closed position by manipulation of the manual reset knob 215.

In view of the foregoing description of the mode of operation of the circuit network, it will be understood that the thermal controls that are derived from cooking vessel supported by the hotplate 16 by the thermistors 58 and 59 are translated into appropriate and corresponding electrical influences applied differentially to the Wheatstone bridge, whereby the Wheatstone bridge is influenced toward a balanced condition. Now the initial unbalance of the Wheatstone bridge is established by the adjustment of the resistors 94 and 95 under the control of the manual dial 71, whereby the amount of electrical control applied to the Wheatstone bridge from the thermistors 58 and 59 is dependent upon the initial adjustment of the manual dial 71, thereby relating the adjusted position of the manual dial 71 to the desired temperature of the cooking vessel supported by the hotplate 16. When the substantial balance of the Wheatstone bridge is restored, the differential relay 190 effects operation of the power switch 205 into its open position. This cycle is repeated in order intermittently to operate the power switch 205 between its closed and open positions effecting modulation of the heating of the hotplate 16 and thereby maintaining the desired temperature of the supported cooking vessel and its contents. Moreover, in the event of the mechanical failure of the power switch 205, the Wheatstone bridge is unbalanced in the opposite direction so that the differential relay 190 is controlled to effect operation of the circuit breaker 210 into its open position.

In the arrangement of the circuit network, it is preferable that the potentiometer 200 be disposed behind the body 11 of the range 10 and comprise a service adjustment facility, as it is not contemplated that the cook will adjust the potentiometer 200. However, the serviceman may adjust the position of the arm 201 with respect to the resistor 202 of the potentiometer 200 so as to effect a proper initial balanced condition of the circuit elements including the windings 192—193 and 194—195 of the differential relay 190, as well as the two sections of the tube 170 and the two resistors 94 and 95, so that the control between the Wheatstone bridge and the amplifiers 170 and the differential relay 190 are appropriate for accurate control purposes. Furthermore, it will be appreciated that the amplifiers 170 are of the push-pull type since the biases supplied to the control grids 175 and 176 from the Wheatstone bridge are differentially related, whereby a small change in the balance condition of the Wheatstone bridge is appropriately amplified to effect the desired control of the differential relay 190; which arrangement is very advantageous in that it lends great sensitivity to the circuit network based upon the temperature of the cooking vessel supported by the hotplate 16 and positive control of the power switch 205 and the circuit breaker 210.

Moreover, it will be appreciated that the initial heating of the hotplate 16 from its cold condition is at full power, since the modulation of the supply of power thereto is not controlled until the desired temperature of the cooking vessel and its contents is reached.

In order to demonstrate the operation of the arrangement under conditions far more adverse than any encountered in cooking operations, a test was devised that involved an exceedingly light load so as to accentuate the temperature swings or variations on either side of the desired temperature by virtue of the exceedingly low ratio between the mass of the load and the mass of the hotplate 16. More particularly, a test plate formed of stainless steel and having the dimensions 5" x 5" x 1/16" was heated on the hotplate 16 and temperature readings were taken from a thermocouple staked to the middle of the test plate as time proceeded.

Referring now to Fig. 6, there is illustrated a characteristic temperature curve C200 of the test plate supported by the hotplate 16 when the manual dial 71 occupied its warm position establishing an average temperature of 200° F. It will be observed that the temperature of the test plate was rapidly elevated from about 75° F. to about 320° F. before the first opening of the power switch 205, and that the temperature of the test plate slowly cooled to a temperature of about 150° F. before the first reclosing of the power switch 205. Thereafter, the temperature of the test plate was modulated between about 245° F. and about 165° F. maintaining the average temperature of about 200° F. The first overshoot and the first undershoot of the temperature of the test plate were brought about by virtue of the circumstance that the initially cold temperature sensing unit 39 required a short time interval to adjust itself to the temperature of the test plate so that it followed rather closely thereafter the temperature thereof.

Referring now to Fig. 7, there is illustrated a characteristic temperature curve C350 of the test plate supported by the hotplate 16 when the manual dial 71 occupied its fry position establishing an average temperature of 350° F. It will be observed that the temperature of the test plate was rapidly elevated from about 75° F. to about 420° F. before the first opening of the power switch 205, and that the temperature of the test plate slowly cooled to a temperature of about 310° F. before the first reclosing of the power switch 205. Thereafter, the temperature of the test plate was modulated between about 360° F. and about 340° F. maintaining the average temperature of about 350° F. The first overshoot and the first undershoot of the temperature of the test plate were brought about by virtue of the circumstance that the initially cold temperature sensing unit 39 required a short time interval to adjust itself to the temperature of the test plate so that it followed rather closely thereafter the temperature thereof.

A comparison of the curves C200 and C350 in the respective Figs. 6 and 7 clearly indicates that the provision of the biasing heater 60 in the temperature sensing unit 39 minimizes the normal swings in the temperature of the test plate; which arrangement is very advantageous at the higher temperatures that are maintained when the manual dial 71 occupies its fry position.

In a similar test, involving as a modest load an aluminum sauce pan of three quarts volume and containing 500 cc. of water, the manual dial 71 was again set into its warm position to establish an average temperature of 200° F. A thermocouple staked to the bottom of the sauce pan indicated a temperature range thereof between 200° F. and 210° F.; while a thermometer suspended in the water contained in the sauce pan indicated a temperature range thereof between 200° F. and 202° F. In this test, the temperature variation was within a narrow range by virtue of the modest ratio between the mass of the load and the mass of the hotplate 16.

In view of the foregoing, it is apparent that there has been provided in heating apparatus of the hotplate type, an improved circuit network for selectively establishing within a relatively wide temperature range the desired cooking temperature of a cooking vessel supported by the hotplate and for selectively controlling the electric power supplied to the hotplate in accordance with the desired cooking temperature thus established so as to maintain this desired cooking temperature of the cooking vessel during the cooking operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric heating unit adapted to support a vessel to be heated, a source of electric power, and a power switch operative between open and closed positions respectively to disconnect and to connect said heating unit with respect to said source; the combination comprising two temperature sensing resistors both arranged in heat exchange relation with a vessel supported by said heating unit, the resistances of said two sensing resistors being simultaneously varied in accordance with the temperature of the vessel supported by said heating unit, a bridge including said two sensing resistors, the balance condition of said bridge being controlled by the resistances of said two sensing resistors, two amplifiers each including an input circuit and an output circuit, means controlled by the balance condition of said bridge for supplying differential input signals to said two input circuits so that the currents in said two output circuits are differentially controlled in order that first and second relationships exist between the currents in said two output circuits when said two sensing resistors respectively have resistances corresponding to a relatively low temperature and resistances corresponding to a relatively high temperature, a relay operative between first and second positions, means responsive to said first and second relationships between the currents in said two output circuits for operating said relay respectively into its first and second positions, and means controlled by operation of said relay into its first and second positions for operating said power switch respectively into its closed and open positions.

2. In electric heating apparatus including an electric heating unit adapted to support a vessel to be heated, a source of electric power, and a power switch operative between open and closed positions respectively to disconnect and to connect said heating unit with respect to said source; the combination comprising two temperature sensing resistors both arranged in heat exchange relation with a vessel supported by said heating unit, the resistances of said two sensing resistors being simultaneously varied in accordance with the temperature of the vessel supported by said heating unit, a bridge including said two sensing resistors, the balance condition of said bridge being controlled by the resistances of said two sensing resistors, two amplifiers each including an input circuit and an output circuit, means controlled by the balance condition of said bridge for supplying differential input signals to said two input circuits so that the currents in said two output circuits are differentially controlled in order that first and second relationships exist between the currents in said two output circuits when said two sensing resistors respectively have resistances corresponding to a relatively low temperature and resistances corresponding to a relatively high temperature, a differential relay provided with two windings respectively included in said two output circuits and operated into first and second positions in response to said respective first and second relationships between the currents in said two output circuits, and means controlled by operation of said relay into its first and second positions for operating said power switch respectively into its closed and open positions.

3. In electric heating apparatus including an electric heating unit adapted to support a vessel to be heated, a source of electric power, and a power switch operative between open and closed positions respectively to disconnect and to connect said heating unit with respect to said source; the combination comprising two temperature sensing resistors both arranged in heat exchange relation with a vessel supported by said heating unit, the resistances of said two sensing resistors being simultaneously varied in accordance with the temperature of the vessel supported by said heating unit, a bridge including said two sensing resistors, the balance condition of said bridge being controlled by the resistances of said two sensing resistors, two electron discharge devices each including an input circuit and an output circuit, means controlled by the balance condition of said bridge for supplying differential biases to said two input circuits so that the currents in said two output circuits are differentially controlled in order that first and second relationships exist between the currents in said two output circuits when said two sensing resistors respectively have resistances corresponding to a relatively low temperature and resistances corresponding to a relatively high temperature, a relay operative between first and second positions, means responsive to said first and second relationships between the currents in said two output circuits for operating said relay respectively into its first and second positions, and means controlled by operation of said relay into its first and second positions for operating said power switch respectively into its closed and open positions.

4. In electric heating apparatus including an electric heating unit adapted to support a vessel to be heated, a source of electric power, and a power switch operative between open and closed positions respectively to disconnect and to connect said heating unit with respect to said source; the combination comprising first and second temperature sensing resistors both arranged in heat exchange relation with a vessel supported by said heating unit, the resistances of said sensing resistors being simultaneously varied in the same direction in accordance with the temperature of the vessel supported by said heating unit, first and second control resistors, means for simultaneously and selectively varying the resistances of said control resistors in the same direction, first and second supply terminals, first and second control terminals, said first sensing resistor being connected across said first supply terminal and said first control terminal, said second sensing resistor being connected across said second supply terminal and said second control terminal, said first control resistor being connected across said first supply terminal and said second control terminal, said second control resistor being connected across said second supply terminal and said first control terminal, means for connecting a supply voltage across said supply terminals, whereby a first control voltage appears upon said first control terminal that is jointly controlled by the resistances of said first sensing resistor and said second control resistor and a second control voltage appears upon said second control terminal that is jointly controlled by the resistances of said second sensing resistor and said first control resistor and changes in the resistances of said sensing resistors in the same direction are productive of differential changes in said first and second control voltages and changes in the resistances of said control resistors in the same direction are productive of differential changes in said first and second control voltages, first and second amplifiers each including an input circuit and an output circuit, means for supplying control signals from said first and second control terminals to the input circuits of said respective first and second amplifiers, and means governed by the differential of the currents in the output circuits of said first and second amplifiers for selectively operating said power switch between its open and closed positions.

5. In electric heating apparatus including an electric heating unit adapted to support a vessel to be heated, a source of electric power, and a power switch operative between open and closed positions respectively to disconnect and to connect said heating unit with respect to said source; the combination comprising first and second temperature sensing resistors both arranged in heat exchange relation with a vessel supported by said heating unit, the resistances of said sensing resistors being simultaneously varied in the same direction in accordance with the temperature of the vessel supported by said heating unit, first and second control resistors, means for simultaneously and selectively varying the resistances of said control resistors in the same direction, first and second supply terminals, first and second control terminals, said first sensing resistor being connected across said first supply terminal and said first control terminal, said second sensing resistor being connected across said second supply terminal and said second control terminal, said first control resistor being connected across said first supply terminal and said second control terminal, said second control resistor being connected across said second supply terminal and said first control terminal, means for connecting a supply voltage across said supply terminals, whereby a first control voltage appears upon said first control terminal that is jointly controlled by the resistances of said first sensing resistor and said second control resistor and a second control voltage appears upon said second control terminal that is jointly controlled by the resistances of said second sensing resistor and said first control resistor and changes in the resistances of said sensing resistors in the same direction are productive of differential changes in said first and second control voltages and changes in the resistances of said control resistors in the same direction are productive of differential changes in said first and second control voltages, first and second electron discharge devices each including an anode and a cathode and a control electrode, means for supplying power to the anode-cathode circuits of said devices, means for applying control biases from said first and second control terminals respectively to the control electrode-cathode circuits of said devices, and means governed by the differential of the currents in the anode-cathode circuits of said devices for selectively operating said power switch between its open and closed positions.

6. In electric heating apparatus including an electric heating unit adapted to support a vessel to be heated, a source of electric power, and a power switch operative between open and closed positions respectively to disconnect and to connect said heating unit with respect to said source; the combination comprising two temperature sensing resistors both arranged in heat exchange relation with a vessel supported by said heating unit, a biasing heater arranged in heat exchange relation with said two sensing resistors, said two sensing resistors each having a high temperature coefficient of resistance, whereby the resistances of said two sensing resistors are jointly controlled by the temperature of the vessel supported by said heating unit and by the energization of said biasing heater, a bridge including said two sensing resistors, the balanced condition of said bridge being controlled when energized by the resistances of said two sensing resistors, a control switch operable into off and on positions respectively to deenergize and to energize said bridge, a device selectively variable to vary the sensitivity of said bridge to variations in the resistances of said two sensing resistors, a manually operable controller having an off position and a variable on position including low and high temperature ranges, means responsive to operation of said controller into its respective off and on positions for operating said control switch respectively into its off and on positions, means controlled by selective operation of said controller in its variable on position for selectively varying said device, means responsive to operation of said controller into the high temperature range of its on position for energizing said biasing heater, two amplifiers each including an input circuit and an output circuit, means controlled by the balanced condition of said bridge for supplying differential input signals to said two input circuits so that the currents in said two output circuits are differentially controlled in order that first and second relationships exist between the currents in said two output circuits when two said sensing resistors respectively have resistances corresponding to a relatively low temperature and resistances corresponding to a relatively high temperature, a relay operative between first and second positions, means responsive to said first and second relationships between the currents in said two output circuits for operating said relay respectively into its first and second positions, and means controlled by operation of said relay into its first and second positions for operating said power switch respectively into its closed and open positions.

7. The electric heating apparatus combination set forth in claim 1, wherein a third relationship exists between the currents in said two output circuits when said two sensing resistors have resistances corresponding to a still higher temperature and further comprising a circuit breaker having a normally closed position and operative into an open position, said circuit breaker in its open position interrupting the supply of electric power to said heating unit regardless of the position of said power switch, and means responsive to said third relationship between the currents in said two output circuits for operating said circuit breaker into its open position.

8. The electric heating apparatus combination set forth in claim 7, wherein said circuit breaker is manually operable back into its normally closed position following automatic operation thereof into its open position.

9. The electric heating apparatus combination set forth in claim 1, and further comprising a manually operable control device having an off position and an on position and a cutout position, said on position being disposed intermediate said off and cutout positions, and a circuit network governed by said control device and responsive to operation of said control device into its on position for enabling said relay and responsive to operation of said control device into either its off position or its cutout position for disabling said relay and also responsive to operation of said control device into its off position for positively operating said power switch into its open position and responsive to operation of said control device into its cutout position for positively operating said power switch into its closed position.

10. The electric heating apparatus combination set forth in claim 9, wherein said on position of said device is adjustable selectively to set the balance condition of said bridge, so as selectively to set the temperature range of control of said bridge upon said relay.

11. In electric heating apparatus including an electric heating unit adapted to support a vessel to be heated, a source of electric power, and a power switch operative between open and closed positions respectively to disconnect and to connect said heating unit with respect to said source; the combination comprising a temperature sensing device arranged in heat exchange relation with a vessel supported by said heating unit and having a temperature controlled thereby, two amplifiers each provided with an input circuit and an output circuit, a bridge selectively governed by the temperature of said sensing device for supplying differential control signals to said input circuits, whereby the currents in said output circuits are differentially controlled in accordance with the temperature of said sensing device, a manually operable device for selectively varying the sensitivity of said bridge to temperature variations of said sensing device, thereby to preset the temperature of the cooking vessel supported by said heating unit that is desired, and means governed by the ratio of the currents in said output circuits for selectively operating said power switch between its open and closed positions, thereby to maintain the preset temperature of the cooking vessel supported by said heating unit.

12. The electric heating apparatus combination set forth in claim 11, and further comprising a potentiometer commonly included in said output circuits for selectively varying the initial ratio between the currents in said output circuits.

References Cited in the file of this patent

UNITED STATES PATENTS

| | | |
|---|---|---|
| 1,276,589 | Steinmetz | Aug. 20, 1918 |
| 1,528,053 | Hands | Mar. 3, 1925 |
| 2,392,635 | Bletz | Jan. 8, 1946 |
| 2,479,319 | Crowley et al. | Aug. 16, 1949 |
| 2,488,580 | Burleigh | Nov. 22, 1949 |
| 2,496,860 | Davis | Feb. 7, 1950 |
| 2,534,097 | Akeley | Dec. 12, 1950 |
| 2,549,095 | Huck | Apr. 17, 1951 |
| 2,552,480 | Dickey | May 8, 1951 |
| 2,602,132 | Young | July 1, 1952 |
| 2,659,801 | Collins | Nov. 17, 1953 |